(12) United States Patent
Imakawa et al.

(10) Patent No.: US 8,639,967 B2
(45) Date of Patent: Jan. 28, 2014

(54) CONTROLLING APPARATUS, METHOD FOR CONTROLLING APPARATUS AND INFORMATION PROCESSING APPARATUS

(75) Inventors: Tamaki Imakawa, Kawasaki (JP);
Hitoshi Matsumori, Kawasaki (JP);
Toshiharu Maekawa, Kawasaki (JP);
Michio Numata, Kawasaki (JP); Satoru Sakai, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/210,422

(22) Filed: Aug. 16, 2011

(65) Prior Publication Data
US 2012/0047397 A1    Feb. 23, 2012

Related U.S. Application Data

(63) Continuation of application No. PCT/JP2009/000749, filed on Feb. 20, 2009.

(51) Int. Cl.
*G06F 11/00*    (2006.01)
(52) U.S. Cl.
USPC ........................................ 714/4.12
(58) Field of Classification Search
USPC .................. 714/4.11, 4.12, 5.11, 13
See application file for complete search history.

(56) References Cited

U.S. PATENT DOCUMENTS

| | | | | |
|---|---|---|---|---|
| 6,658,590 B1 * | 12/2003 | Sicola et al. | ................. | 714/6.21 |
| 6,915,445 B2 * | 7/2005 | Navar et al. | ................... | 714/4.12 |
| 6,978,398 B2 * | 12/2005 | Harper et al. | .................... | 714/13 |
| 7,111,189 B1 * | 9/2006 | Sicola et al. | ................. | 714/6.21 |
| 7,752,495 B2 * | 7/2010 | Zorek et al. | ..................... | 714/13 |
| 7,774,646 B2 * | 8/2010 | Smith et al. | ..................... | 714/13 |
| 8,051,328 B1 * | 11/2011 | Smith et al. | ..................... | 714/15 |
| 2004/0199808 A1 * | 10/2004 | Freimuth et al. | ................... | 714/4 |
| 2010/0017648 A1 * | 1/2010 | Teruta et al. | .................... | 714/4 |
| 2010/0218034 A1 * | 8/2010 | Sirigiri et al. | ..................... | 714/4 |

FOREIGN PATENT DOCUMENTS

| | | |
|---|---|---|
| JP | 01-019436 | 1/1989 |
| JP | 2-29832 | 1/1990 |
| JP | 6-214816 | 8/1994 |
| JP | 6-301568 | 10/1994 |
| JP | 9-218797 | 8/1997 |
| JP | 2002-49502 | 2/2002 |
| JP | 2003-296133 | 10/2003 |

OTHER PUBLICATIONS

International Search Report mailed May 26, 2009 for International Application No. PCT/JP2009/000749.
Office action issued by the Japanese Patent Office on Apr. 23, 2013 in the corresponding Japanese patent application No. 2011-500362.
Office Action issued by the Japanese Patent Office on Oct. 8, 2013 in the corresponding Japanese patent application No. 2011-500362.

* cited by examiner

*Primary Examiner* — Marc Duncan
(74) *Attorney, Agent, or Firm* — Staas & Halsey LLP (57) ABSTRACT

A controlling apparatus for controlling an information processing apparatus, the controlling apparatus includes a first controller including a first data transfer unit that communicates data between the information processing apparatus, and a first processing unit that generates a command to instruct the first data transfer unit to communicate data between the information processing apparatus, and a second controller including a second data transfer unit that communicates data between the information processing apparatus, and a second processing unit that generates a command to instruct the second data transfer unit to communicate data between the information processing apparatus.

6 Claims, 11 Drawing Sheets

CONTROLLING APPARATUS, METHOD FOR CONTROLLING APPARATUS AND INFORMATION PROCESSING APPARATUS

CROSS-REFERENCE TO RELATED APPLICATION

This is a continuation of International Application No. PCT/JP2009/000749 filed on Feb. 20, 2009, the entire contents of which are incorporated herein by reference.

FIELD

An aspect of the embodiment discussed herein is related to a controlling apparatus, a method for controlling a controlling apparatus and an information processing system.

BACKGROUND

There is an information processing apparatus that includes system control boards that control computer hardware, function as system control devices and form a redundant configuration. The information processing apparatus is a server that may be used for various usage purposes, for example. In addition, the information processing apparatus is a system that achieves high reliability since the information processing apparatus includes the system control boards that form the redundant configuration.

In the information processing system, one of the system control boards has a central processing unit (CPU) and a memory (storage device). The one of the system control boards controls computer hardware components such as a system board (for performing arithmetic processing), a crossbar board (for transferring data between the system control boards) and an input/output (I/O) board (for performing input/output control of a hard disk drive, a network, and the like). The one of the system control boards manages and monitors the computer hardware components. The other system control board is in a standby state in case the one of the system control boards, which controls the information processing apparatus and is in an operating state, fails.

However, when the server switches the system control boards during transfer of data between at least one of the computer hardware components (such as the system boards, the crossbar board and the I/O board) and a direct memory access (DMA) master (DMA controller) mounted on the system control board that is in the operating state, the following phenomenon occurs. The state of a DMA master that is mounted on the system control board that is changed from the standby state to an operating state owing to the switching of the system control boards is different from the state of the DMA master mounted on the system control board that is changed from the operating state to a standby state owing to the switching of the system control boards.

Thus, the system control board that has been changed from the standby state to the operating state may not take over the operating state of the system control board that has been changed from the operating state to the standby state.

Japanese Laid-open Patent Publication No. 2002-049502 discloses a technique related to an information processing system that has control mechanisms that form a redundant configuration.

SUMMARY

According to an aspect of an embodiment, a controlling apparatus for controlling an information processing apparatus, the controlling apparatus includes a first controller including a first data transfer unit that communicates data between the information processing apparatus, and a first processing unit that generates a command to instruct the first data transfer unit to communicate data between the information processing apparatus, and a second controller including a second data transfer unit that communicates data between the information processing apparatus, and a second processing unit that generates a command to instruct the second data transfer unit to communicate data between the information processing apparatus, wherein the first data transfer unit notifies the second data transfer unit of progress information that indicates a progress in communicating data between the first data transfer unit and the information processing apparatus, and when the first data transfer unit detects a failure of the first controller, the second data transfer unit performs the communicating between the information processing apparatus on the basis of the progress information.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT

First, the outline of an information processing apparatus 100 according to an embodiment is described with reference to FIG. 1. The information processing apparatus 100 is a server that may be used for various usage purposes and achieves high reliability.

Figure 1:
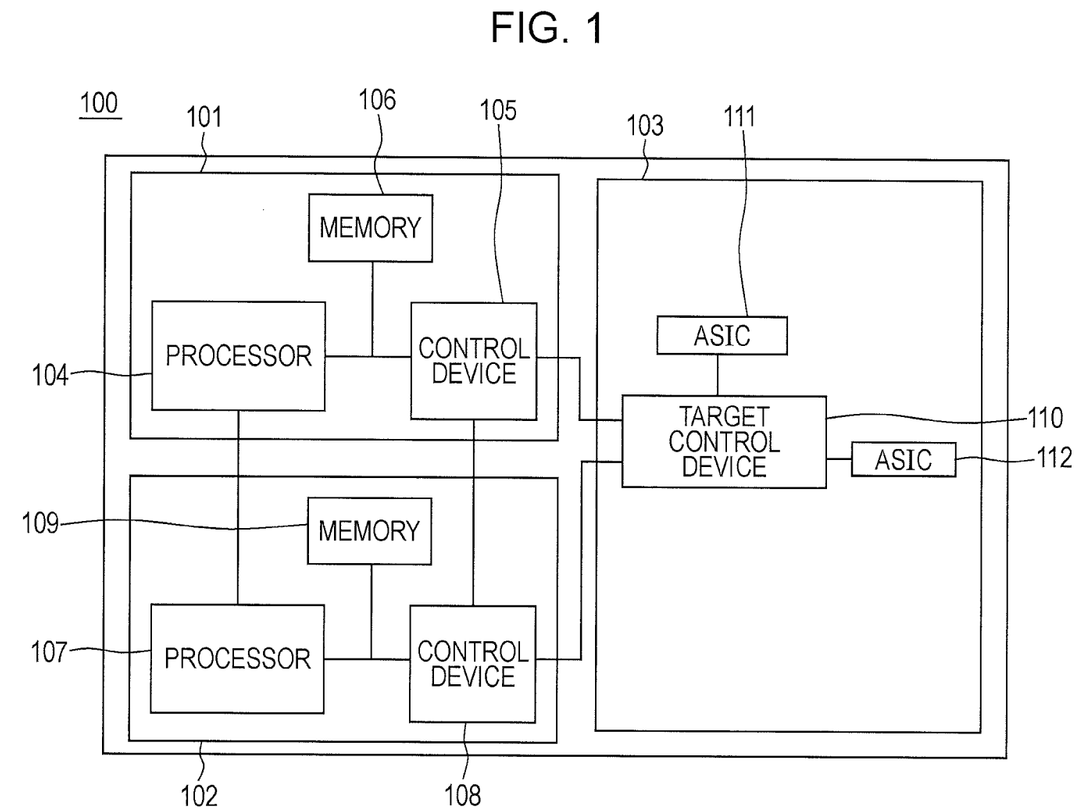
FIG. 1 is a block diagram illustrating a hardware configuration of an information processing apparatus according to an embodiment.

FIG. 1 is a block diagram illustrating a hardware configuration of the information processing apparatus 100 according to the present embodiment. The information processing apparatus 100 includes a plurality of control boards 101 and 102 and a computer hardware component 103. The control boards 101 and 102 function as system control devices. The control boards 101 and 102 of the information processing apparatus 100 according to the present embodiment form a redundant configuration. Since the information processing apparatus 100 according to the present embodiment has the control boards 101 and 102, the information processing apparatus 100 has a duplicated control mechanism. The units of the information processing apparatus 100, or the control boards 101 and 102 and the computer hardware component 103, are described below.

The control boards 101 and 102 are units that each comprehensively control an operation of the information processing apparatus 100. In the present embodiment, the control board 101 is currently used (or is in an active state (an operating state)) and controls the computer hardware component 103. On the other hand, in the present embodiment, the control board 102 is in a standby state and provided as a spare of the control board 101 in case the control board 101 fails. The operating state of the control board 101 is a state in which the control board 101 controls the computer hardware component 103. The computer hardware component 103 is a unit that is installed in a system board, a crossbar board, an I/O board or the like and processes information. The computer hardware component 103 transmits and receives data to and from the control board 101 on the basis of an instruction received from the control board 101, while the data is necessary for the control board 101 to perform management and the like. The instruction that is received from the control board 101 by the computer hardware component 103 is an instruction related to monitoring and control of the information processing apparatus 100.

The standby state of the control board 102 is a state in which the control board 102 is in the standby state and does not control the computer hardware component 103. When the control board 101 fails, the control board 102 is switched from the standby state to the operating state and takes over a control process performed by the control board 101. The control process that is performed on the computer hardware component 103 by the control board 101 includes turning on and off of the computer hardware component 103, monitoring of temperatures of a CPU and the like that are included in the system board (that is one of computer hardware components 103), and management of validity or invalidity of an electrical connection.

The control board 101 includes a processor 104, a control device 105 and a memory 106. The control board 101 uses these units to control the computer hardware component 103. Similarly, the control board 102 that forms the redundant configuration with the control board 101 includes a processor 107, a control device 108 and a memory 109. When the control board 101 fails, the control board 102 uses these units to control the computer hardware component 103.

The units that are included in the control boards 101 and 102 are described below.

The processor 104 instructs the control device 105 to transfer data between the control board 101 and a target control device 110. The processor 104 is different from the CPU included in the system board that executes an application and the like. The processor 104 controls the information processing apparatus as described later. The processor 104 instructs the control device 105 to start the data transfer and perform setting for the start of the data transfer. In addition, the processor 104 analyzes data stored in the memory 106 and manages and monitors the computer hardware component 103, for example. For example, the processor 104 references, from the memory 106, information of the temperatures of LSIs included in the computer hardware component 103, and monitors the temperatures of the LSIs. Furthermore, the processor 104 references, from the memory 106, information of voltages of the LSIs included in the computer hardware component 103, and monitors the voltages of the LSIs. In order to switch the control board that operates in the information processing apparatus 100 from the control board 101 to the control board 102, the processor 104 reads data stored in the memory 106 included in the control board 101 and transfers the read data to the memory 109 included in the control board 102.

In addition, the processor 104 that is included in the control board 101 transmits a process request to the control device 105, and notifies the processor 107 included in the control board 102 of the process request. The process request is an instruction that is provided from the processor 104 to the control device 105. Since the processor 104 notifies the processor 107 included in the control board 102 in the standby state of the process request (transmitted from the processor 104 to the control device 105) on an as-needed basis, the information processing apparatus 100 may switch the control board 101 to the control board 102.

The control device 105 performs communication (data transfer) with the computer hardware component 103 in response to an instruction provided from the processor 104. Specifically, in response to the instruction provided from the processor 104, the control device 105 performs the data transfer with the target control device 110 such as a CPU included in the computer hardware component 103 such as the system board. In addition, when the control device 105 receives the instruction from the processor 104, the control device 105 transfers the instruction (provided from the processor 104) for the setting and the instruction (provided from the processor 104) for the start of the process to the control device 108. Thus, the control device 108 may maintain the same status as the control device 105.

The control devices 105 and 108 are devices that have direct memory access (DMA) master functions that control DMA transfer to be performed between the memory from which the data is transferred and a DMA slave to which the data is transferred. Specifically, the control device 105 performs the DMA transfer between the memory 106 and the target control device 110 that is the DMA slave without the processor 104. Similarly, when the control device 108 causes data to be transferred between the memory 109 and the target control device 110 that is the DMA slave, the control device 108 performs the DMA transfer without the processor 107. When the control device 105 transfers data to the computer hardware component 103 and receives a response to the data from the computer hardware component 103, the control device 108 also receives the response from the computer hardware component 103. In this case, the control device 108 that is in the standby state does not transfer data to the computer hardware component 103.

The control device 105 is described below in detail with reference to FIG. 9. The control device 108 has the same configuration as the control device 105 illustrated in FIG. 9.

Figure 9:
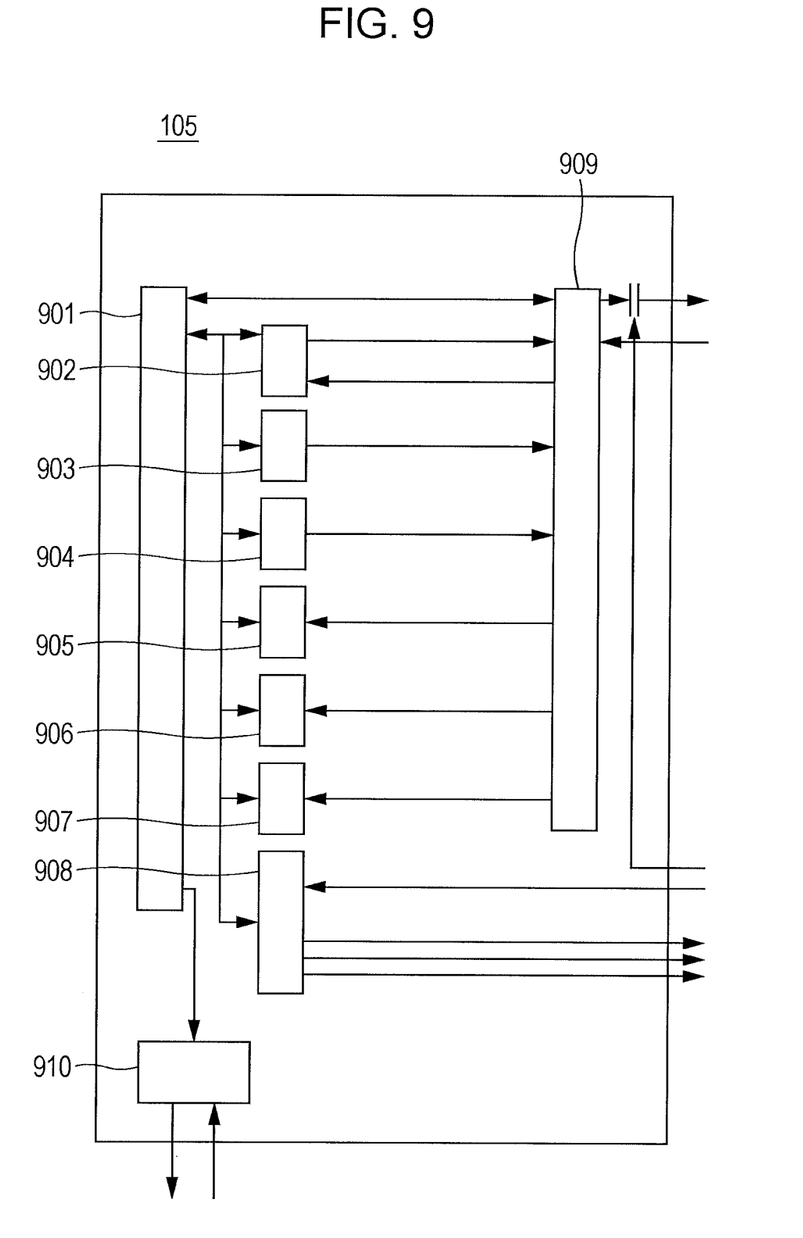
FIG. 9 is a diagram illustrating a hardware configuration of the control device according to the embodiment.

FIG. 9 is a diagram illustrating a hardware configuration of the control device 105 according to the present embodiment. The control device 105 includes a local bus controller 901, a data size register 902, a target address register 903, a memory address register 904, a status register 905, a termination status register 906, an error status register 907, a duplication control register 908, a DMA controller 909 and a communication interface 910. The local bus controller 901 is connected to the data size register 902, the target address register 903, the memory address register 904, the status register 905, the termination status register 906, the error status register 907, the duplication control register 908, the DMA controller 909 and the communication interface 910. The DMA controller 909 is connected to the data size register 902, the target address register 903, the memory address register 904, the status register 905, the termination status register 906, and the error status register 907.

The local bus controller 901 is connected to the processor 104 and the memory 106. In FIG. 9, the processor 104 and the memory 106 are not illustrated. The local bus controller 901 transmits the process request received from the processor 104, or the instruction to set each of the registers and the instruction to start the process, to the control device 108 through the communication interface 910. Specifically, the local bus controller 901 transmits the process request (received from the processor 104) to a communication interface included in the control device 108 through the communication interface 910. The communication interface 910 is connected to the communication interface of the control device 108. In the present embodiment, the communication interface 910 and the communication interface of the control device 108 are connected to each other through serial lines such as an Inter-Integrated Circuit (I2C) bus or Joint Test Architecture Group (JTAG) lines. In other words, the communication interface 910 and the communication interface of the control device 108 are connected to each other through a data transmission line and a data reception line.

The data size register 902 is a register that holds the size of data that is transferred to the target control device 110 by the control device 105. In a write sequence, when the control device 105 receives an instruction from the processor 104 in order for the control device 105 to transfer data stored in the memory 106 to the computer hardware component 103, the control device 105 sets, in the data size register 902, the size of the data to be transferred.

In a read sequence, the control device 105 receives an instruction from the processor 104 in order for the control device 105 to transfer data from the computer hardware component 103 to the memory 106 in which the data is to be stored, the control device 105 sets, in the data size register 902, the size of the data to be transferred. When the control device 105 performs the DMA transfer, the data size that is set in the data size register 902 is reduced by the size of transferred data. In this case, the DMA controller 909 reduces the data size set in the data size register 902. When the DMA controller 909 reduces the data size set in the data size register 902 and the data size set in the data size register 902 becomes zero, the DMA transfer is stopped.

The target address register 903 is a register that holds addresses of electronic parts such as ASICs 111 and 112 included in the computer hardware component 103 to which the data is transferred by the control device 105. The local bus controller 901 sets the addresses in the target address registers 903. The DMA controller 909 causes the addresses held by the target address register 903 to be included in a command packet and the transmits the command packet to the target control device 110. The command packet is a packet that includes a command to be transmitted to the target control device 110 by the control device 105 and enables the control device 105 to notify the target control device 110 of the start of the data transfer.

The memory address register 904 is a register in which an address of the memory 106 is set. The address (of the memory 106) to be set in the memory address register 904 is an address (of the memory 106) at which the data is written in the DMA transfer or an address (of the memory 106) from which the data is read in the DMA transfer.

The status register 905 is a register that holds a status of the DMA transfer that is performed by the control device 105. The status that is held by the status register 905 is an accessing status that indicates that the control device 105 is accessing a target; an execution cancellation status that indicates that a detail of a command issued for the target control device 110 by the control device 105 is invalid; or any of access progress statuses that indicates the progress of the access performed by the control device 105. There are a plurality of the access progress statuses. The progress status of the access that is performed by the control device 105 is determined on the basis of a progress code assigned on the basis of the percentage of the progress of the access that is performed by the control device 105.

The termination status register 906 is a register that holds a status that indicates that the DMA transfer that is performed by the control device 105 is terminated. The status that is held by the termination status register 906 is a normal termination status that indicates that the DMA transfer is normally terminated; or an error termination status that indicates that an error occurs in the DMA transfer and the DMA transfer is terminated.

The error status register 907 is a register that holds a status that indicates the type of an error that causes the DMA transfer to be terminated. The status that is held by the error status register 907 is a negative acknowledgement (Nack) reception status that indicates that the control device 105 receives, from the target, a Nack packet that indicates that an error exists in a packet received by the target; a timeout status that indicates that the target does not provides a response to the control device 105 for a predetermined time period and a timeout occurs; or a parity error status that indicates that the local bus controller 901 detects a parity error in data to be transferred.

The duplication control register 908 is a register that holds operation status information that indicates that the control board 101 is in the operating state or the standby state. The duplication control register 908 may receive, from the control device 108 included in the control board 102, a status signal that indicates that the control device 108 is in an operating state. The operation status information that indicates the operating state is hereinafter called active information, while the operation status information that indicates the standby state is hereinafter called standby information. The control device 105 controls the state (operating state or standby state) of the control board 101 on the basis of the information held by the duplication control register 908.

When the duplication control register 908 changes the held status information of the control device 105 from the active information to the standby information, the duplication control register 908 of the control device 105 transmits, to the control device 108, a status signal that corresponds to the status information. When a duplication control register that is included in the control device 108 receives the status signal from the duplication control register 908 of the control device 105, the duplication control register of the control device 108 changes the standby information held by the duplication control register of the control device 108 to the active information. When the duplication control register 908 receives a status signal from the control device 108, the duplication control register 908 changes the standby information held by the duplication control register 908 to the active information.

In addition, the duplication control register 908 has a function of receiving a forced stop signal from the duplication control register included in the control device 108. The duplication control register 908 also has a function of transmitting a forced stop signal to the duplication control register included in the control device 108. The forced stop signal is a signal that forcibly stops transmission of data from the DMA controller 909 to a DMA controller of the control device 108; or a signal that forcibly stops transmission of data from the DMA controller of the control device 108 to the DMA controller 909. In the present embodiment, the duplication control register 908 has a function of transmitting, to the control board 102, an light emitting diode (LED) lighting signal that causes an LED (not illustrated) included in the control board 102 to light.

Similarly, the duplication control register that is included in the control device 108 has a function of transmitting, to the control board 101, an LED lighting signal that causes an LED (not illustrated) included in the control board 101 to light. In the present embodiment, the lighting of the LED of any of the control boards means that the control board is in the operating state. A user of the information processing apparatus 100 and an administrator of the information processing apparatus 100 may easily recognize whether the control board 101 or the control board 102 is in the operating state.

The DMA controller 909 is a unit that performs transmission (DMA transfer) of data from the memory 106 to the target control device and performs reception (DMA transfer) of data from the target control device so that the data is stored in the memory 106.

In addition, the DMA controller 909 reduces the data size set in the data size register 902, reads the addresses held by the target address register 903, and reads the address held by the memory address register 904. Furthermore, the DMA controller 909 transmits the status information to the status register 905, the termination status register 906 and the error status register 907. The DMA controller 909 has a failure detection circuit (not illustrated). When the failure detection circuit detects a failure of a data transfer path, such as a disconnection of the data transfer path, the failure detection circuit sets a failure detection flag. The DMA controller 909 transmits, to the local bus controller 901, a value of the failure detection flag as a failure detection signal. The local bus controller 901 transmits the failure detection signal to the processor 104. The processor 104 instructs the duplication control register 908 to change the status information held by the duplication control register 908 from the active information to the standby information. The duplication control register 908 changes the status information held by the duplication control register 908 from the active information to the standby information. The duplication control register 908 transmits, to the control device 108, the status signal that indicates the changed status information. When the duplication control register that is included in the control device 108 receives the status signal from the duplication control register 908 of the control device 105, the duplication control register that is included in the control device 108 changes the status information held by the duplication control register of the control device 108 from the standby information to the active information. In this manner, when the failure detection circuit detects a failure of the data transfer path, the information processing apparatus 100 changes the state of the control board 102 to the operating state. In addition, when an error occurs, for example, when software that is installed in the information processing apparatus 100 fails to be executed, the information processing apparatus 100 changes the state of the control board 102 to the operating state.

The communication interface 910 that is included in the control device 105 is connected through the serial lines to the communication interface that is included in the control device 108. When the control board 101 is in the operating state, the communication interface 910 notifies the communication interface included in the control device 108 of information on a process that is currently performed by the control device 105. Similarly, when the control board 102 is in the operating state, the communication interface that is included in the control device 108 notifies the communication interface 910 of information on a process that is currently performed by the control device 108. The information (transmitted by the communication interface 910) on the process that is currently performed by the control device 105 is the information that is related to the DMA transfer performed by the control device 105 and held by the registers 902 to 907 in the example illustrated in FIG. 9.

The information processing apparatus 100 according to the present embodiment has a communication path between the control device 105 and the control device 108. The control device 105 notifies the control device 108 of the state (status) of the data transfer (write/read process) performed by the control device 105 in response to the process request provided from the processor 104.

Thus, the status of the control device 108 may be updated to the state of the process that is currently performed by the control device 105. When the control board 101 is changed from the operating state to the standby state and the control board 102 is changed from the standby state to the operating state, the control device 108 may efficiently, smoothly take over the process performed by the control device 105.

The memory 106 is a storage unit that stores data read from the target control device 110 by the control device 105 and data to be written in the target control device 110 by the control device 105. The memory 109 is a storage unit that stores data read from the target control device 110 by the control device 108 and data to be written in the target control device 110 by the control device 108.

As described above, the computer hardware component 103 includes the target control device 110. The target control device 110 is connected to the control device 105 and the control device 108. The target control device 110 is connected to the custom LSIs such as the ASICs 111 and 112.

The target control device 110 has a DMA master function that performs DMA transfer between the target control device 110 and the control devices 105 and 108 without the CPU included in the computer hardware component 103.

Figure 2:
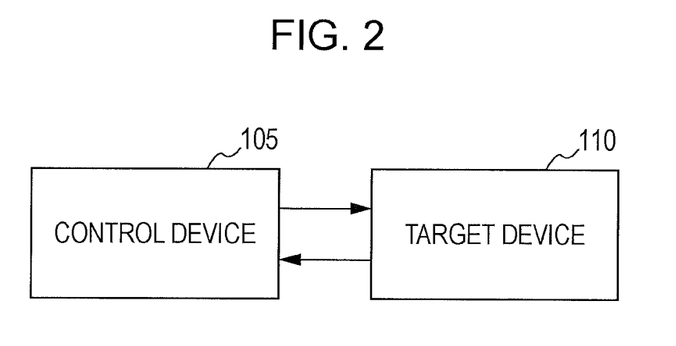
FIG. 2 is a diagram illustrating a connection between a control device according to the embodiment and a target control device.
Figure 3:
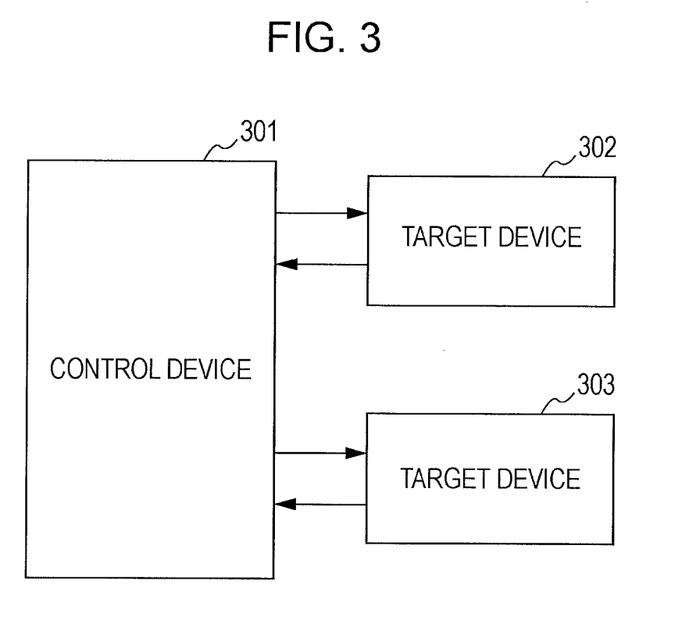
FIG. 3 is a diagram illustrating connections between a control device according to the embodiment and target control devices.
Figure 4:
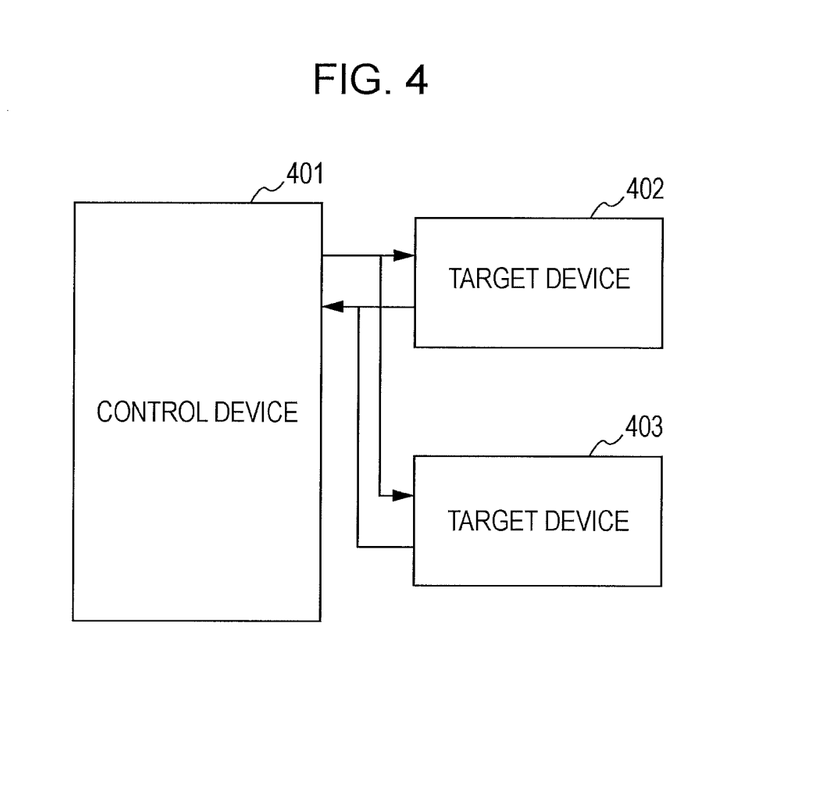
FIG. 4 is a diagram illustrating connections between a control device according to the embodiment and target control devices.

FIG. 2 is a diagram illustrating the configuration of the connection between the control device 105 and the target control device 110. FIG. 3 is a diagram illustrating the configuration of connections between a control device 301 and target control devices 302 and 303. FIG. 4 is a diagram illustrating the configuration of connections between a control device 401 and target control devices 402 and 403. FIGS.

3 and 4 are diagrams each illustrating the configuration of the connections between a single control device and a plurality of target control devices.

In the present embodiment, as illustrated in FIG. 2, the control device 105 is connected to the target control device 110 through serial lines such as an I2C bus. Since the control device 105 is connected to the target control device 110 through the serial lines, the information processing apparatus 100 performs data transmission and reception at a high speed. In addition, since the control device 105 is connected to the target control device 110 through the serial lines, the connection between the control device 105 and the target control device 110 may be established so that the number of the signal lines is smaller than the number of parallel lines when the control device 105 is connected to the target control device 110 through the parallel lines.

Figure 5:
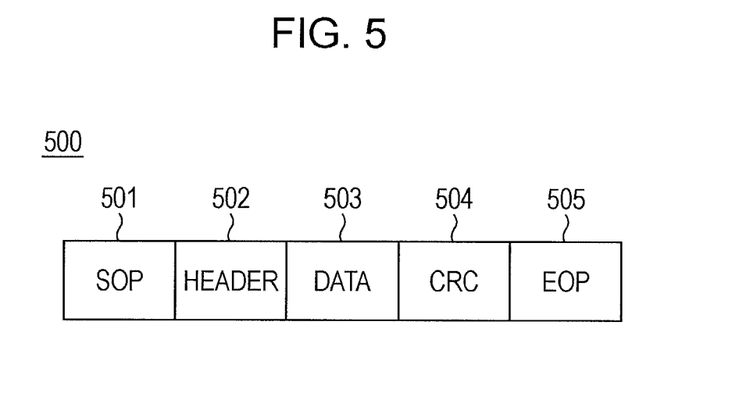
FIG. 5 is a diagram illustrating the configuration of a command packet according to the embodiment.

FIG. 5 is a diagram illustrating the configuration of a command packet 500 according to the present embodiment. A read data packet and a write data packet have the same configuration as the command packet 500.

The command packet 500 is a packet that is used for a command to be transmitted to the target by the control device 105. When data transfer is taken as an example, the command packet 500 is a packet that notifies that the control device 105 starts transfer of data to the target through the target control device 110. Specifically, the command packet 500 is a packet that notifies that the DMA controller 909 starts transfer of the data to a DMA controller of the target control device 110.

The command packet 500 is constituted by a start of packet (SOP) 501, a header 502, data 503, a cyclic redundancy check (CRC) 504 and an end of packet (EOP) 505. The SOP 501 is information that indicates the position of a start point of the packet. The header 502 includes information that indicates the type of the packet to which details of the data 503 belong. The information that is included in the header 502 identifies that the packet is a command packet. The data 503 is information that indicates details of the command to be transmitted using the packet 500. The CRC 504 is information that is used to check an error in the header 502 and the data 503. The CRC 504 is an error check code that is used to determine that an error exists when a bit string is regarded as a coefficient of a polynomial, data having a remainder added thereto is transferred so that the bit string is divisible by a predetermined generator polynomial, and the bit string is not divisible in the receiving unit. The EOP 505 is information that indicates the position of an end point of the packet. When the data is write data, the data 503 indicates details of the write data. When the data is read data, the data 503 indicates details of the read data. The control device that references the header 502 and receives the packet identifies whether the packet is the write data or the read data.

Figure 6:
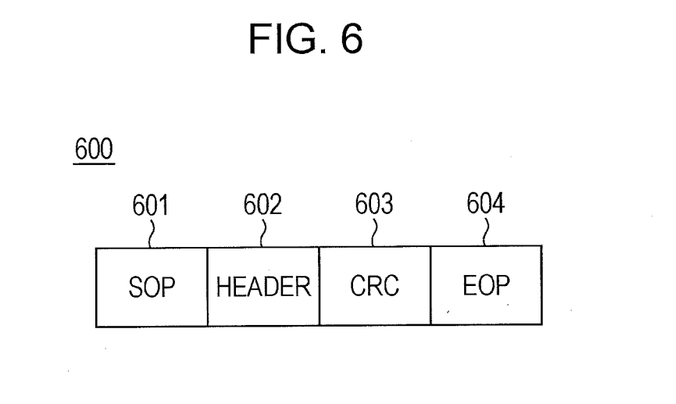
FIG. 6 is a diagram illustrating the configuration of an Ack packet according to the embodiment.

FIG. 6 is a diagram illustrating the configuration of an acknowledgement (Ack) packet 600 according to the present embodiment. The Nack packet has the same configuration as the Ack packet 600.

The Ack packet 600 is a packet that is transmitted from the target to the control devices 105 and 108 or from the control devices 105 and 108 to the target in order to confirm a response to a packet received between the target and the control devices 105 and 108. For example, the Ack packet 600 is a packet that is transmitted to the DMA controller 909 of the control device 105 and the DMA controller of the control device 108 through the DMA controller of the target control device 110 from the target when the target receives the command packet 500. In addition, the Ack packet 600 is a response packet that indicates that the target normally receives packets from the control devices 105 and 108 or that the control devices 105 and 108 normally receive packets from the target.

As illustrated in FIG. 6, the Ack packet 600 is constituted by a SOP 601, a header 602, a CRC 603 and an EOP 604. The SOP 601 is information that indicates the position of a start point of the packet. The header 602 includes information that indicates that the packet is an Ack packet. The CRC 603 is information that is used to check an error in the header 602. The EOP 604 is information that indicates the position of an end point of the packet.

The Nack packet is a packet that is transmitted from the target to the control devices 105 and 108 or from the control devices 105 and 108 to the target in order to confirm a response to a packet received between the target and the control devices 105 and 108. For example, the Nack packet is a packet that is transmitted to the DMA controller 909 of the control device 105 and the DMA controller of the control device 108 through the DMA controller of the target control device 110 from the target when the target receives the command packet 500. The Nack packet is a response packet that indicates that the target receives a packet that has an error. The Nack packet is constituted by an SOP, a header, a CRC and an EOP in the same manner as the Ack packet.

Figure 7:
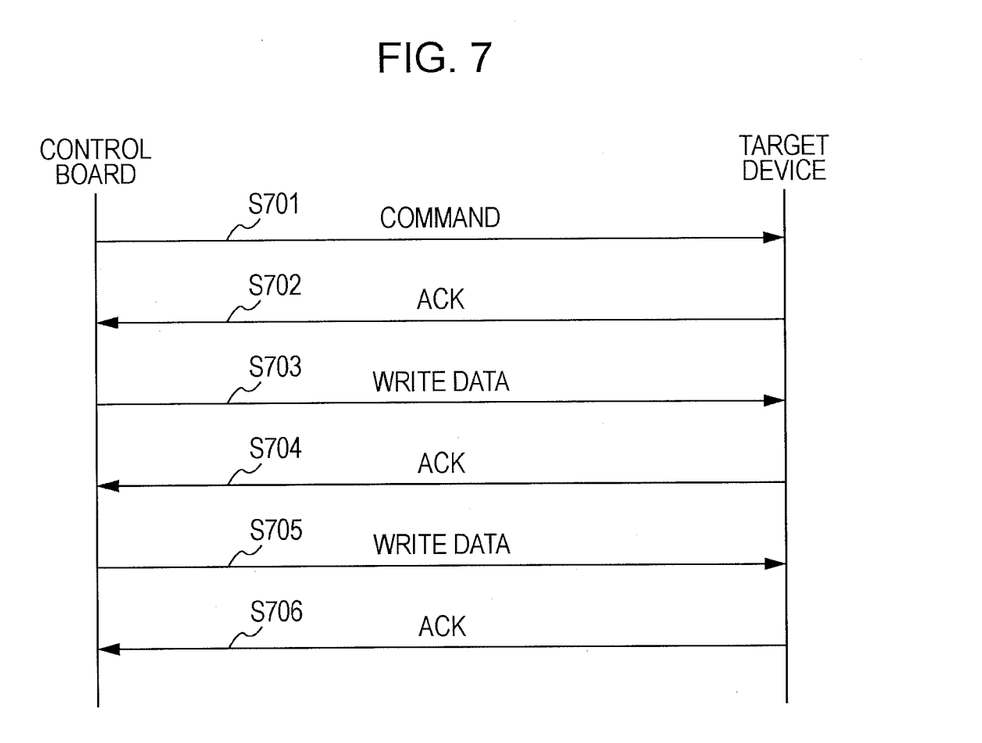
FIG. 7 is a diagram illustrating a sequence of transmission and reception of packets between a control board according to the embodiment and a computer hardware component.
Figure 8:
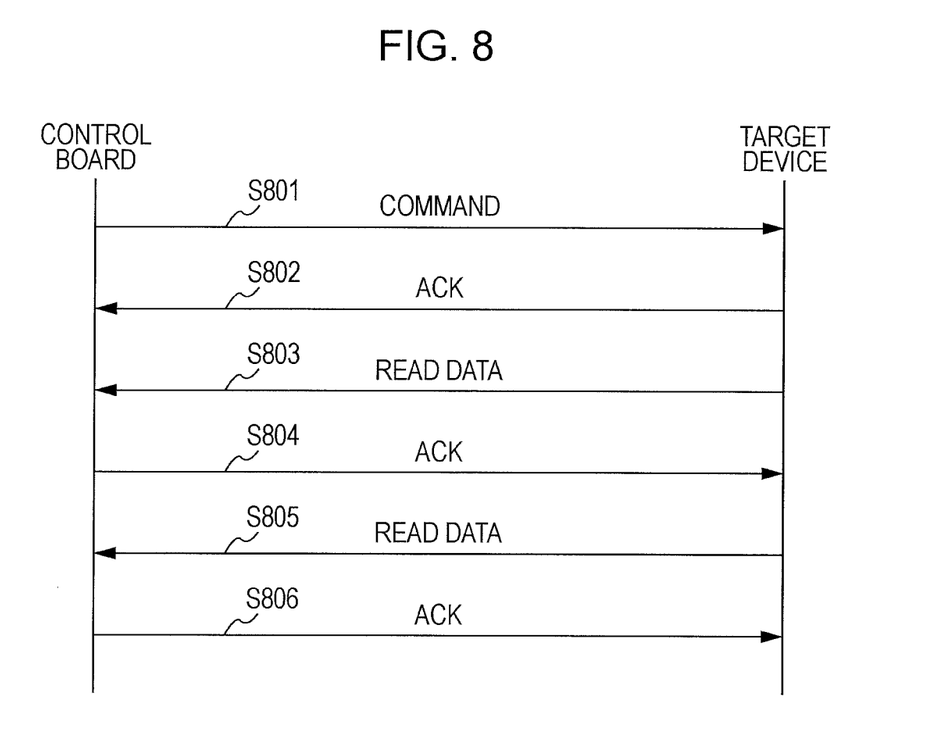
FIG. 8 is a diagram illustrating a sequence of transmission and reception of packets between the control board according to the embodiment and the computer hardware component.

FIGS. 7 and 8 are diagrams illustrating sequences of transmission and reception of packets between the control board 101 (control device 105) according to the present embodiment and the computer hardware component 103 (target control device 110). FIG. 7 illustrates the sequence (write sequence) of data to be written in the computer hardware component 103 by the control board 101. FIG. 8 illustrates the sequence (read sequence) of data to be read from the computer hardware component 103 by the control board 101.

First, the write sequence illustrated in FIG. 7 is described. The control board 101 transmits, to the computer hardware component 103, a command packet as a command (in operation S701). The computer hardware component 103 transmits, to the control board 101, an Ack packet as a response to the command packet (in operation S702). When the control board 101 receives the Ack packet, the control board 101 transmits write data (write packet) to the computer hardware component 103 (in operation S703). The computer hardware component 103 transmits, to the control board 101, an Ack packet as a response to the write data (in operation S704). The control board 101 further transmits write data to the computer hardware component 103 (in operation S705). The computer hardware component 103 transmits, to the control board 101, an Ack packet as a response to the write data (in operation S706).

Next, the read sequence illustrated in FIG. 8 is described.

The control board 101 transmits a command packet to the computer hardware component 103 (in operation S801). The computer hardware component 103 transmits, to the control board 101, an Ack packet as a response to the command packet (in operation S802). Then, the computer hardware component 103 transmits read data (read packet) to the control board 101 (in operation S803). The control board 101 transmits, to the computer hardware component 103, an Ack packet as a response to the read data (in operation S804). The computer hardware component 103 further transmits read data to the control board 101 (in operation S805). The control board 101 transmits, to the computer hardware component 103, an Ack packet as a response to the read data (in operation S806).

In the write sequence illustrated in FIG. 7 and the read sequence illustrated in FIG. 8, the computer hardware component 103 also transmits the Ack packets to the control board 102.

In the write sequence illustrated in FIG. 7 and the read sequence illustrated in FIG. 8, when the computer hardware component 103 determines that an error exists in at least one of the packets (write packets and read packets) received by the computer hardware component 103, the computer hardware component 103 transmits, to the control board 101, a Nack packet as a response that indicates that the error is detected.

Figure 10:
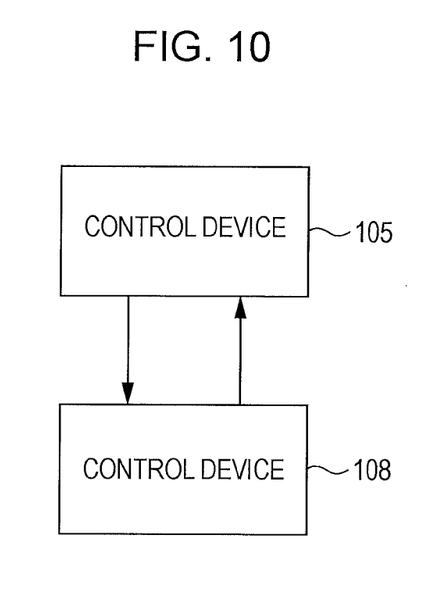
FIG. 10 is a diagram illustrating a connection between the control device according to the embodiment and another control device according to the embodiment.

FIG. 10 is a diagram illustrating the connection between the control device 105 and the control device 108. The control device 105 is connected to the control device 108 through a pair of the unidirectional serial line for transmission and the unidirectional serial line for reception. Since the control device 105 and the control device 108 are connected to each other through the serial lines, the control device 105 and the control device 108 may each transmit and receive data to and from the other control device and efficiently share the state of the other control device.

Figure 11:
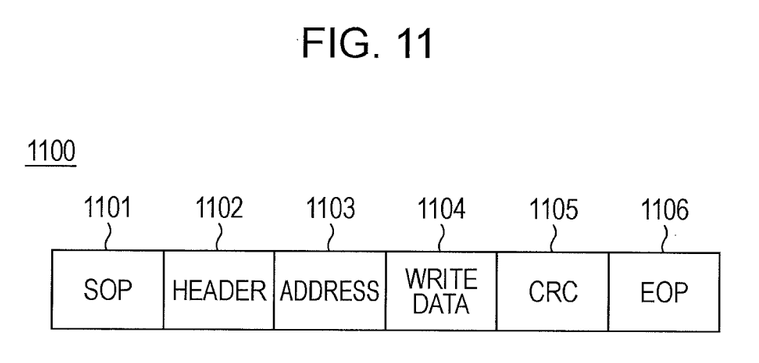
FIG. 11 is a diagram illustrating the configuration of a packet that is transmitted and received between the control device according to the embodiment and the other control device according to the embodiment.

FIG. 11 is a diagram illustrating the configuration of a packet 1100 that is transmitted and received between the control device 105 and the control device 108.

The packet 1100 is constituted by an SOP 1101, a header 1102, an address 1103, write data 1104, a CRC 1105 and an EOP 1106. The SOP 1101 is information that indicates the position of a start point of the packet 1100. The header 1102 includes information that indicates the type of the packet 1100 to which details of the write data 1104 belong. The address 1103 is information of an address of a device to which the packet 1100 is transmitted. Specifically, the address 1103 is information of an address of the control device 105 or information of an address of the control device 108. The write data 1104 is information that indicates details of the packet 1100. The CRC 1105 is information that is used to check an error in the write data 1104. The EOP 1106 is information that indicates the position of an end point of the packet 1100.

Figure 12:
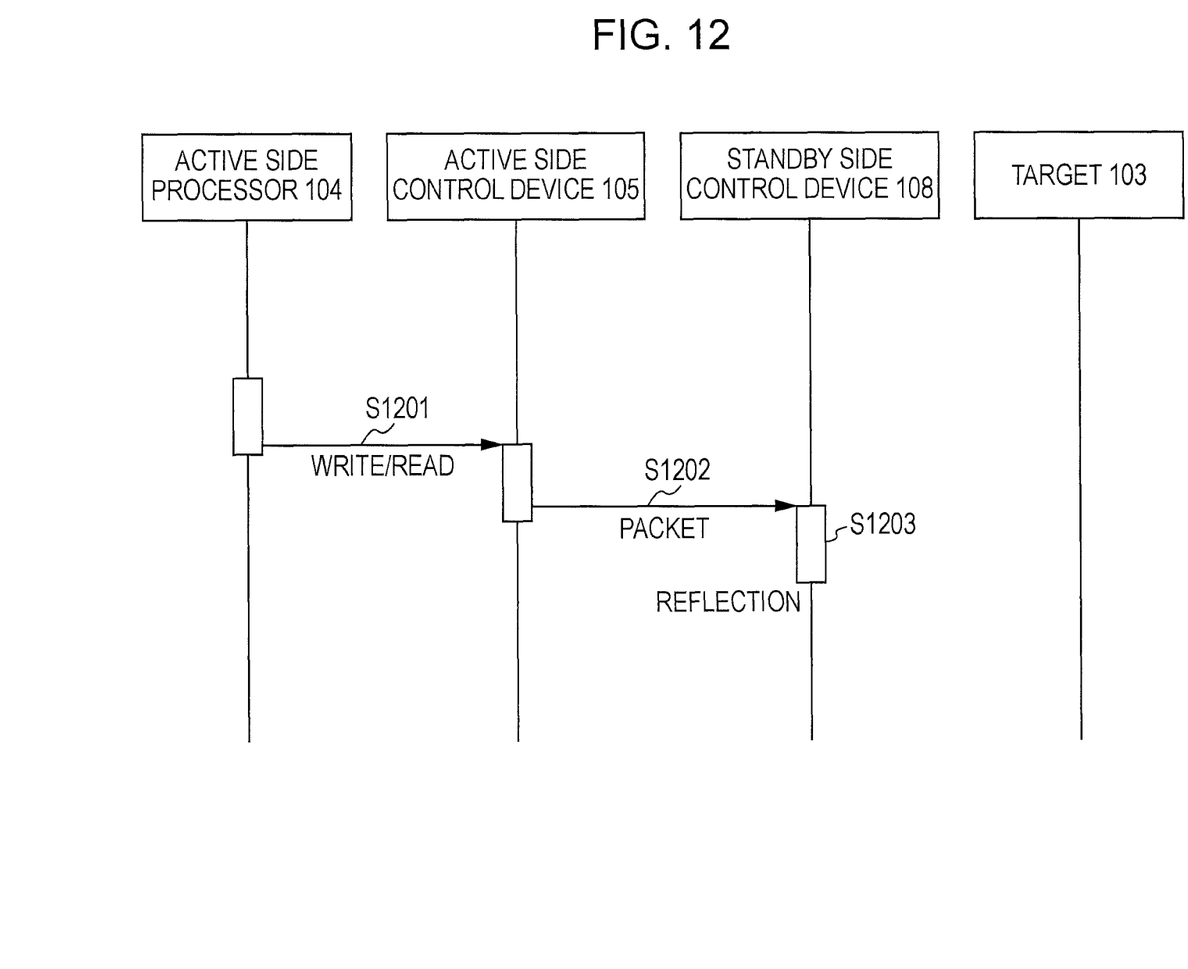
FIG. 12 is a diagram illustrating a sequence of synchronization between the control device according to the embodiment and the other control device according to the embodiment.

FIG. 12 is a diagram illustrating a sequence of synchronization between the control devices 105 and 108 according to the present embodiment. In the synchronization sequence, a series of operations are performed until the state of the process of the DMA transfer performed by the control device 105 becomes the same as the state of the process of the DMA transfer to be performed by the control device 108. The states of the processes are information that is related to the processes of the DMA transfer and held by the registers included in the control devices 105 and 108.

FIG. 12 is the diagram illustrating the sequence of the synchronization that is performed by causing the control device 105 to notify the control device 108 of the status of the control device 105 when the control board 101 is in the operating state. When the control board 102 is in the operating state, the synchronization is performed by causing the control device 108 to notify the control device 105 of the status of the control device 108 in the same manner as the synchronization sequence illustrated in FIG. 12.

When the processor 104 instructs the control device 105 to write or read data (in operation S1201), the control device 105 transmits, to the control device 108, a command packet instructing the control device 108 to write or read the data, and transmits a data packet to the control device 108 (in operation S1202). Then, the control device 108 uses write data included in the packet received from the control device 105, updates data held by the registers included in the control device 108, and reflects the status of the control device 105 in the control device 108 (in operation S1203).

Figure 13:
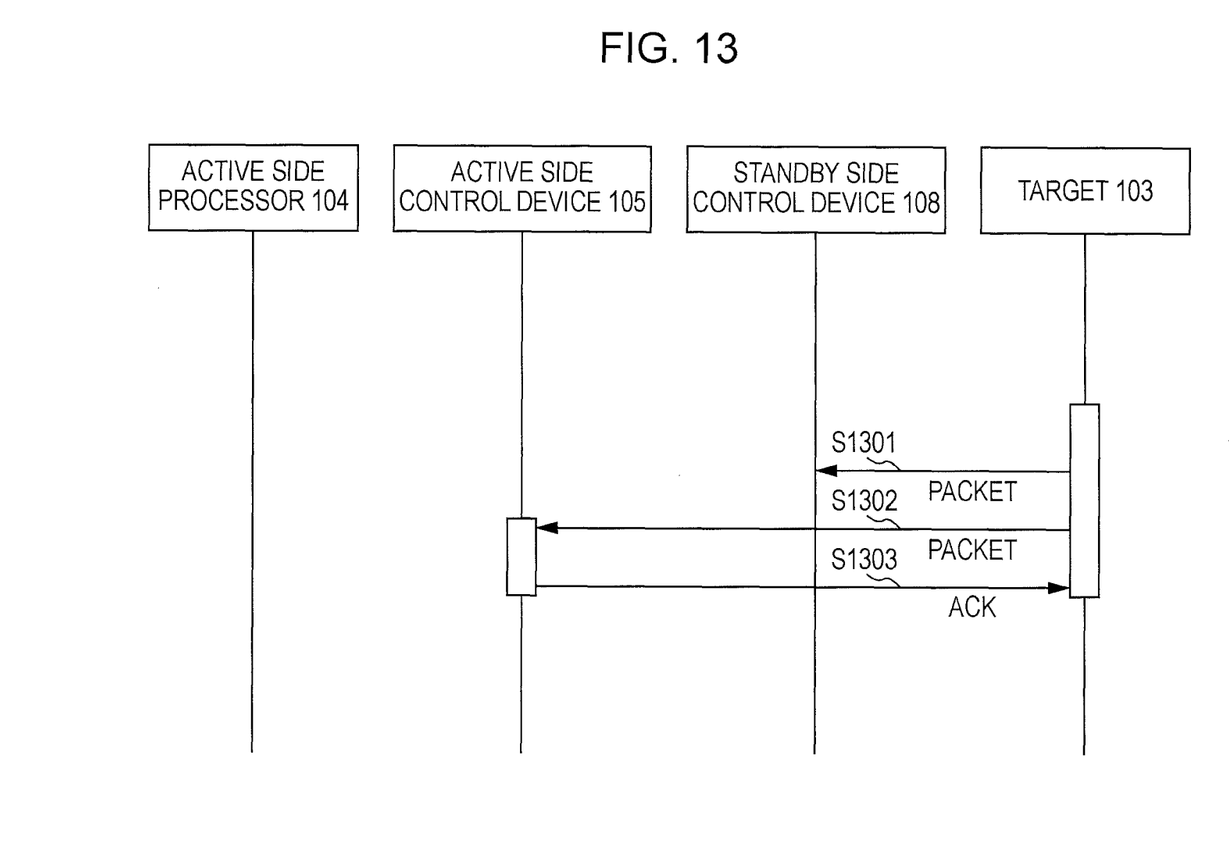
FIG. 13 is a diagram illustrating a sequence of responses that are provided by the control devices according to the embodiment.

FIG. 13 is a diagram illustrating a sequence of responses that are provided by the control devices 105 and 108 according to the present embodiment. In the response sequence, the computer hardware component 103 transmits, to the control devices 105 and 108, data packets as responses to command packets received from the control devices 105 and 108, and the control devices 105 and 108 transmit, to the computer hardware component 103, Ack packets as responses to the data packets.

The computer hardware component 103 transmits a packet (read data and the like) to the control device 105 (in operation S1301) and transmits a packet (read data and the like) to the control device 108 (in operation S1302). When the control device 105 receives the packet from the computer hardware component 103, the control device 105 transmits an Ack packet to the computer hardware component 103 (in operation S1303). On the other hand, the control device 108 that has not issued a command does not transmit an Ack packet to the computer hardware component 103.

In this case, the control board 101 is in the operating state, while the control board 102 is in the standby state.

Next, a detailed operational sequence of the information processing apparatus 100 is described.

Figure 14:
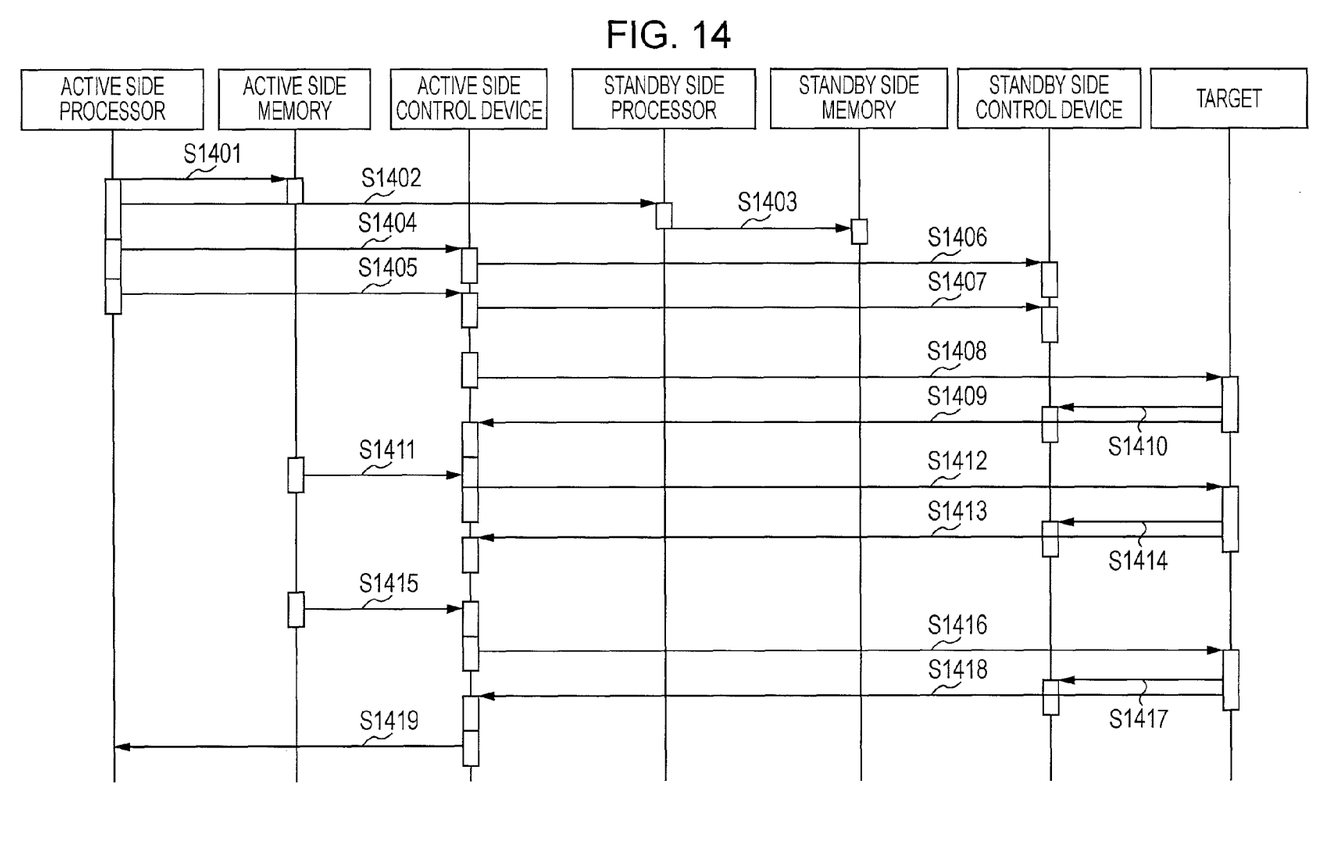
FIG. 14 is a diagram illustrating a sequence of a writing process to be performed by the information processing apparatus according to the embodiment.

FIG. 14 is a diagram illustrating a sequence of a writing process to be performed by the information processing apparatus 100 according to the present embodiment. In the writing process, the control board 101 causes data to be written in the target of the computer hardware component 103. In order for the information processing apparatus 100 to perform the writing process, the processor 104 first prepares write data in the memory 106 (in operation S1401). Specifically, in operation S1401, the processor 104 specifies the data that is stored in the memory 106 and is to be written in the computer hardware component 103. The processor 104 transmits the write data to the processor 107 included in the control board 102 (in operation S1402) and causes the write data to be written in the memory 109 of the control board 102 in the standby state through the processor 107 (in operation S1403).

Then, the processor 104 transmits a packet to the control device 105, instructs the control device 105 to set each of the registers of the control device 105 (in operation S1404), and instructs the control device 105 to start the writing process (in operation S1405). The control device 105 reflects the settings of the registers included in the control device 105 in the registers included in the control device 108 (in operation S1406). The control device 105 transfers, to the control device 108, a command packet that indicates the instruction to start the DMA transfer on the basis of the setting instruction included in a command packet transmitted from the processor 104 (in operation S1407).

The control device 105 sets the progress status held by the status register 905 to "start of write command". Then, the control device 105 transmits a command packet to the target control device 110 (in operation S1408). The target control device 110 transmits, to the control device 105, an Ack packet as a response to the command packet (in operation S1409). In addition, the target control device 110 transmits an Ack packet to the control device 108 (in operation S1410).

When the control device 105 receives, from the target control device 110, the Ack packet as the response to the command packet, the control device 105 sets the progress status held by the status register 905 to "command transmitted". Then, the control device 105 reads write data from the memory 106 (in operation S1411) and transmits a write packet to the target control device 110 (in operation S1412). The target control device 110 transmits, to the control device 105, an Ack packet as a response to the write packet (in operation S1413) and transmits an Ack packet to the control device 108 (in operation S1414). Subsequently, the control device 105 reads write data from the memory 106 (in operation S1415) and transmits a write packet to the target control device 110 (in operation S1416). The target control device 110 transmits, to the control devices 105 and 108, Ack packets as responses to the write packet (in operations S1417 and S1418). When the control device 105 causes all write data to be completely written in the target control device 110, the control device 105 transmits, to the processor 104, a notification that indicates termination of the DMA transfer (in operation S1419).

Figure 15:
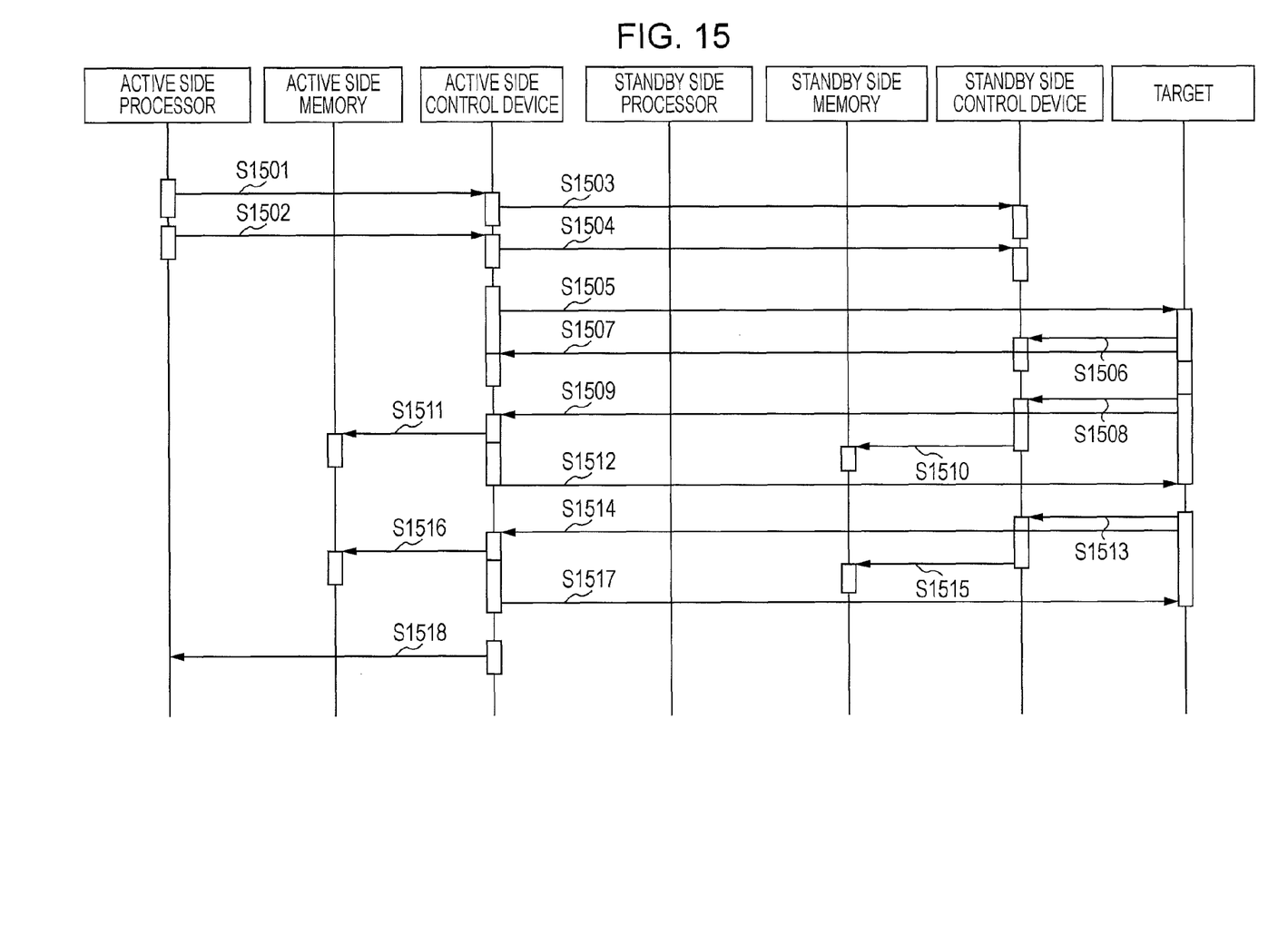
FIG. 15 is a diagram illustrating a sequence of a reading process to be performed by the information processing apparatus according to the embodiment.

FIG. 15 is a diagram illustrating a sequence of the reading process that is performed by the information processing apparatus 100 according to the present embodiment. In the reading process, the control board 101 reads data from the target of the computer hardware component 103.

In order for the information processing apparatus 100 to perform the reading process, the processor 104 first transmits a packet to the control device 105 and instructs the control device 105 to set each of the registers included in the control device 105 (in operation S1501). The processor 104 transmits another packet to the control device 105 and instructs the control device 105 to start the reading process (in operation S1502). The control device 105 transfers, to the control device 108, the command packets that indicate the instruction of the settings and the start of the reading process (in operations S1503 and S1504). The control device 108 reflects the status of the control device 105.

The control device 105 sets the progress status held by the status register 905 to "start of read command". Then, the control device 105 transmits, to the target control device 110, a command packet as a command (in operation S1505). The target control device 110 transmits, to the control devices 105 and 108, Ack packets as responses to the command packet (in operation S1506 and S1507). When the control device 105 receives the Ack packet, the control device 105 sets the progress status held by the status register 905 to "command transmitted".

Then, the control device 105 reads data (read data) from the target of the computer hardware component 103 (in operation S1509) and causes the read data to be stored in the memory 106 (in operation S1511). In addition, the control device 108 reads data (read data) from the target of the computer hardware component 103 (in operation S1508) and causes the read data to be stored in the memory 109 (in operation S1510). The control device 105 sets the progress status held by the status register 905 to "data received", subtracts the received read data from the data size set in the data size register 902, and updates the data size. Similarly, the control device 108 sets the progress status held by the status register included in the control device 108 to "data received", subtracts the received read data from the data size set in the data size register included in the control device 108, and updates the data size. Then, the control device 105 transmits, to the computer hardware component 103, an Ack packet as a response to the command packet (in operation S1512). Similarly, the control device 105 reads data (read data) from the target of the computer hardware component 103 (in operation S1514) and causes the read data to be stored in the memory 106 (in operation S1516). In addition, the control device 108 reads data (read data) from the target of the computer hardware component 103 (in operation S1513) and causes the read data to be stored in the memory 109 (in operation S1515). The control device 105 sets the progress status held by the status register 905 to "data received", further subtracts the received read data from the data size set in the data size register 902, and updates the data size. Similarly, the control device 108 sets the progress status held by the status register included in the control device 108 to "data received", further subtracts the received read data from the data size set in the data size register included in the control device 108, and updates the data size. Then, the control device 105 transmits an Ack packet to the computer hardware component 103 (in operation S1517). When the control device 105 completes reading all read data from the target control device 110 so that the data size held by the data size register 902 becomes zero, the control device 105 transmits, to the processor 104, a notification that indicates termination of the DMA transfer (in operation S1518).

The information processing apparatus 100 may include the control devices 101 and 102 and another control board. When the information processing apparatus 100 includes three or more control boards, the information processing apparatus 100 has higher reliability against a communication failure.

In the present embodiment, the information processing apparatus 100 includes the one computer hardware component 103. However, the information processing apparatus 100 may include two or more computer hardware components such as system boards. When the information processing apparatus 100 includes two or more computer hardware components, the calculation performance of the information processing apparatus 100 may be improved.

In the information processing apparatus according to the embodiment, when one of the control boards that form the redundant configuration is switched to the other of the control boards, the other of the control boards may take over a control process performed by the one of the control boards. The information processing apparatus according to the embodiment is very effective when one of the control boards that form the redundant configuration needs to be switched to the other of the control boards.

All examples and conditional language recited herein are intended for pedagogical purposes to aid the reader in understanding the embodiment and the concepts contributed by the inventor to furthering the art, and are to be construed as being without limitation to such specifically recited examples and conditions, nor does the organization of such examples in the specification relate to a illustrating of the superiority and inferiority of the embodiment. Although the embodiment has been described in detail, it should be understood that the various changes, substitutions, and alterations could be made hereto without departing from the spirit and scope of the invention.

What is claimed is:

1. A controlling apparatus to control an information processing apparatus, the controlling apparatus comprising:
a first controller including
a first data transfer unit that issues a command packet to the information processing apparatus, receives a response to the command packet from the information processing apparatus, and transmits an Ack packet to the information processing apparatus, and
a first processing unit that generates a command to instruct the first data transfer unit to communicate data between the information processing apparatus;
a second controller including
a second data transfer unit that receives a response to the command packet from the information processing apparatus, and
a second processing unit that generates a command to instruct the second data transfer unit to communicate data between the information processing apparatus; and a communication line dedicated for communication between the first data transfer unit and the second data transfer unit, wherein the first data transfer unit notifies, via the communication line, the second data transfer unit of progress information that indicates a progress in communicating data between the first data transfer unit and the information processing apparatus to reflect a status of the first data transfer unit in the second data transfer unit, the progress information including information to instruct the second data transfer unit to write or read data which the first data transfer unit has been instructed by the first processing unit to write or read to or from the information processing apparatus, and when the first data transfer unit detects a failure of the first controller, the second data transfer unit performs the communicating between the information processing apparatus based on the progress information.

2. The controlling apparatus according to claim 1, wherein the first data transfer unit communicates data to the information processing apparatus through a first transfer path, and when the first data transfer unit detects a failure of the first transfer path, the first processing unit transfers data stored in a storage device included in the first controller to a storage device included in the second controller through a second transfer path which couples the first controller and the second controller.

3. The controlling apparatus according to claim 1, wherein when the first data transfer unit detects a failure of the first transfer path, the second processing unit takes over the generation of the first command from the first processing unit, and the second data transfer unit communicates data between the information processing apparatus in response to the command generated by the second processing unit.

4. The controlling apparatus according to claim 1, wherein when the information processing apparatus receives the control information from the first data transfer unit, the first data transfer unit receives a response from the information processing apparatus indicating that the information processing apparatus receives data from the first data transfer unit.

5. A method to control a controlling apparatus that includes a first controller which includes a first data transfer unit and a first processing unit, and a second controller which includes a second data transfer unit and a second processing unit, the method comprising:

issuing, by the first data transfer unit, a command packet to the information processing apparatus;

receiving, by the first data transfer unit, a response to the command packet from the information processing apparatus;

transmitting, by the first data transfer unit, an Ack packet to the information processing apparatus;

generating, by the first processing unit, a command to instruct the first data transfer unit to communicate data between the information processing apparatus;

receiving, by the second data transfer unit, a response to the command packet from the information processing apparatus; and generating, by the second processing unit, a command to instruct the second data transfer unit to communicate data between the information processing apparatus, wherein the first data transfer unit notifies, via a communication line, which is dedicated for communication between the first data transfer unit and the second data transfer unit, the second data transfer unit of progress information that indicates a progress in communicating data between the first data transfer unit and the information processing apparatus to reflect a status of the first data transfer unit in the second data transfer unit, the progress information including information to instruct the second data transfer unit to write or read data which the first data transfer unit has been instructed by the first processing unit to write or read to or from the information processing apparatus, and when the first data transfer unit detects a failure of the first controller, the second data transfer unit performs the communicating between the information processing apparatus based on the progress information.

6. An information processing apparatus comprising:

a processing device;

a first controller including a first data transfer unit that issues a command packet to the processing device, receives a response to the command packet from the processing device, and transmits an Ack packet to the processing device, and a first processing unit that generates a command to instruct the first data transfer unit to communicate data between the processing device;

a second controller including a second data transfer unit that receives a response to the command packet from the processing device, and a second processing unit that generates a command to instruct the second data transfer unit to communicate data between the processing device; and a communication line dedicated for communication between the first data transfer unit and the second data transfer unit, wherein the first data transfer unit notifies, via the communication line, the second data transfer unit of progress information that indicates a progress in communicating data between the first data transfer unit and the processing device to reflect a status of the first data transfer unit in the second data transfer unit, the progress information including information to instruct the second data transfer unit to write or read data which the first data transfer unit has been instructed by the first processing unit to write or read to or from the information processing device, and when the first data transfer unit detects a failure of the first controller, the second data transfer unit performs the communicating between the processing device based on the progress information.

* * * * *